US009531453B2

(12) United States Patent
Yamazaki

(10) Patent No.: US 9,531,453 B2
(45) Date of Patent: Dec. 27, 2016

(54) COMMUNICATION CONTROL METHOD, USER TERMINAL, AND BASE STATION

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 84 days.

(21) Appl. No.: 14/381,097

(22) PCT Filed: Feb. 27, 2013

(86) PCT No.: PCT/JP2013/055200
§ 371 (c)(1),
(2) Date: Aug. 26, 2014

(87) PCT Pub. No.: WO2013/129504
PCT Pub. Date: Sep. 6, 2013

(65) Prior Publication Data
US 2015/0049688 A1 Feb. 19, 2015

Related U.S. Application Data

(60) Provisional application No. 61/604,685, filed on Feb. 29, 2012.

(51) Int. Cl.
H04B 7/04 (2006.01)
H04W 16/28 (2009.01)
(Continued)

(52) U.S. Cl.
CPC .......... *H04B 7/0417* (2013.01); *H04B 7/0456* (2013.01); *H04B 7/0632* (2013.01);
(Continued)

(58) Field of Classification Search
CPC .................................................... H04B 7/024
(Continued)

(56) References Cited

U.S. PATENT DOCUMENTS 8,494,006 B2 * 7/2013 Lee ............................... 370/203
8,565,334 B2 10/2013 Ito
(Continued)

FOREIGN PATENT DOCUMENTS

EP 2 190 130 A1 5/2010
KR 2011-0132979 A 12/2011
(Continued)

OTHER PUBLICATIONS

The extended European search report issued by the European Patent Office on Oct. 13, 2015, which corresponds to European Patent Application No. 13754735.2-1852 and is related to U.S. Appl. No. 14/381,097.
(Continued)

*Primary Examiner* — Andrew Lai
*Assistant Examiner* — Andrew C Lee
(74) *Attorney, Agent, or Firm* — Studebaker & Brackett PC

(57) ABSTRACT

A communication control method is applied to a mobile communication system including a base station that transmits a downlink signal through a plurality of antenna ports, and a user terminal that feeds back precoder matrix information to the base station, the downlink signal being precoded by using a precoder matrix, the precoder matrix information being indicating a precoder matrix preferably used in a downlink. The communication control method comprises: a step of feeding back, by the user terminal, correction value information for correcting the precoder matrix information to the base station when the precoder matrix information is fed back or after the precoder matrix information is fed back.

10 Claims, 12 Drawing Sheets

(51) Int. Cl.
*H04B 7/06* (2006.01)
*H04L 1/00* (2006.01)
*H04B 7/02* (2006.01)
*H04L 27/00* (2006.01)

(52) U.S. Cl.
CPC ......... *H04B 7/0639* (2013.01); *H04B 7/0641* (2013.01); *H04B 7/0652* (2013.01); *H04L 1/0026* (2013.01); *H04L 1/0031* (2013.01); *H04W 16/28* (2013.01); *H04B 7/024* (2013.01); *H04B 7/0452* (2013.01); *H04B 7/0643* (2013.01); *H04B 7/0665* (2013.01); *H04L 27/0008* (2013.01)

(58) Field of Classification Search
USPC .................................. 370/328, 329, 330, 331
See application file for complete search history.

(56) References Cited

U.S. PATENT DOCUMENTS

| | | | | |
|---|---|---|---|---|
| 8,649,456 B2* | 2/2014 | Xia | ...................... | H04B 7/0626 370/208 |
| 2009/0046569 A1* | 2/2009 | Chen | ..................... | H04L 1/0029 370/203 |
| 2011/0007685 A1 | 1/2011 | Ma et al. | | |
| 2011/0170623 A1 | 7/2011 | Park et al. | | |
| 2012/0008699 A1 | 1/2012 | Ito | | |
| 2012/0082248 A1* | 4/2012 | Han | ..................... | H04B 7/0413 375/259 |
| 2012/0106388 A1* | 5/2012 | Shimezawa | ............ | H04B 7/024 370/252 |
| 2012/0121031 A1* | 5/2012 | Tang | ..................... | H04B 7/0691 375/267 |
| 2012/0176996 A1* | 7/2012 | Kim | .................. | H04W 72/0413 370/329 |
| 2013/0003788 A1* | 1/2013 | Marinier | ................ | H04B 7/024 375/219 |
| 2013/0070723 A1 | 3/2013 | Yie et al. | | |
| 2013/0202015 A1* | 8/2013 | Frank | ................... | H04B 7/0632 375/219 |

FOREIGN PATENT DOCUMENTS

| | | |
|---|---|---|
| WO | 2009/023686 A2 | 2/2009 |
| WO | 2010/109518 A1 | 9/2010 |
| WO | 2011/051914 A1 | 5/2011 |
| WO | 2011/085082 A2 | 7/2011 |

OTHER PUBLICATIONS

International Search Report; PCT/JP2013/055200; Apr. 16, 2013.
3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

* cited by examiner

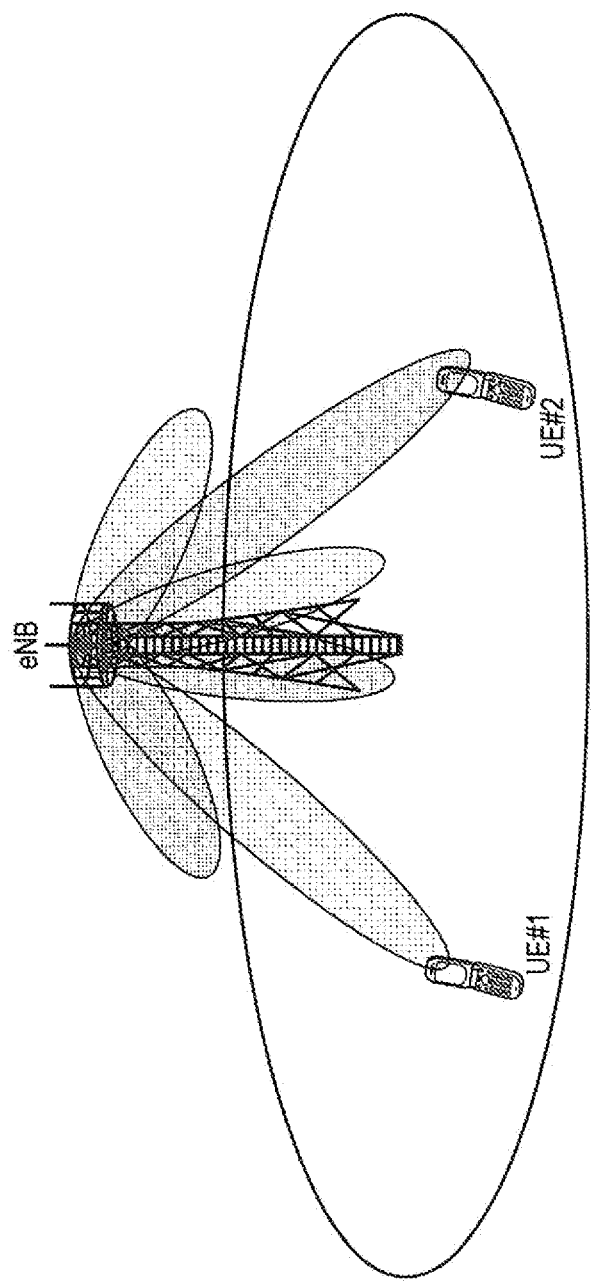

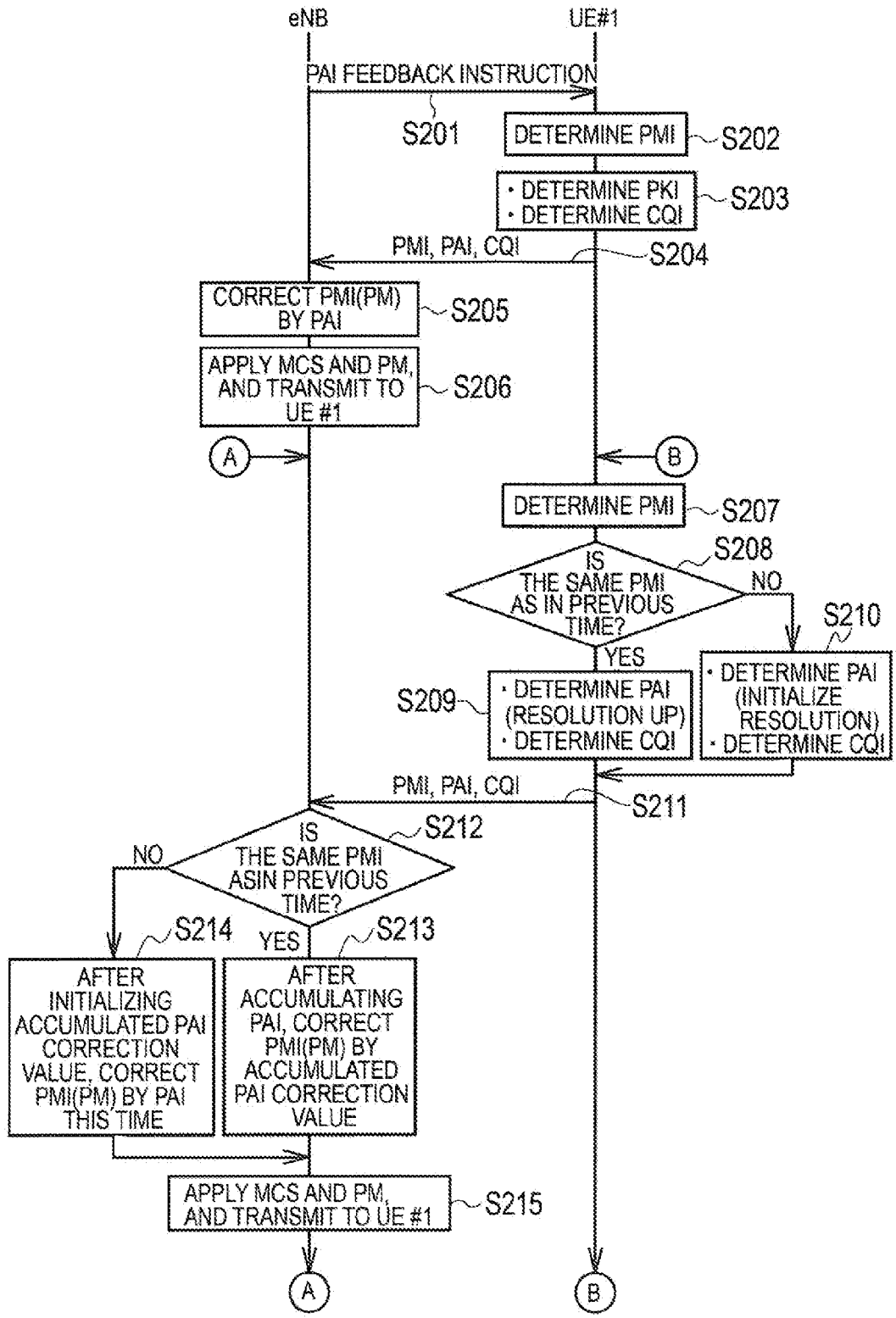

COMMUNICATION CONTROL METHOD, USER TERMINAL, AND BASE STATION

TECHNICAL FIELD

The present invention relates to a communication control method, a user terminal, and a base station, which deal with precoder matrix information.

BACKGROUND ART

3GPP (3rd Generation Partnership Project), which is a project aiming to standardize a mobile communication system, supports a multi-antenna transmission technology, in which a base station directs a beam toward a specific user terminal while directing a null toward another user terminal (see, for example, Non Patent Document 1).

In order to realize such a multi-antenna transmission technology using an FDD scheme, each of a plurality of user terminals feeds back precoder matrix information, which indicates a precoder matrix preferred to be used in a downlink, to a base station.

The base station precodes a downlink signal using the precoder matrix based on the precoder matrix information fed back from each user terminal. Then, the base station transmits the precoded downlink signal through a plurality of antenna ports (a plurality of feeding points). The precoder matrix includes a plurality of precoder matrix elements (a plurality of weights) corresponding to the plurality of antenna ports.

PRIOR ART DOCUMENT

Non-Patent Document
Non-patent Document 1: 3GPP technology specifications "TS 36.300 V11. 0. 0" December, 2011

SUMMARY OF THE INVENTION

However, since resolution of precoder matrix information defined in the current specifications is insufficient, there is a problem that it is difficult for a base station to direct a beam toward a specific user terminal while accurately directing a null toward another user terminal.

Therefore, an object of the present invention is to provide a communication control method in which a base station is able to appropriately direct a beam/a null toward a user terminal; a user terminal; and a base station.

In order solve the problems described above, the present invention includes following features.

A communication control method of the present invention is applied to a mobile communication system including a base station that transmits a downlink signal through a plurality of antenna ports, and a user terminal that feeds back precoder matrix information to the base station, the downlink signal being precoded by using a precoder matrix, the precoder matrix information being indicating a precoder matrix preferably used in a downlink. The communication control method comprises: a step A of feeding back, by the user terminal, correction value information for correcting the precoder matrix information to the base station when the precoder matrix information is fed back or after the precoder matrix information is fed back.

The communication control method may further comprises: a step B of instructing, by the base station, the user terminal to notify the correction value information, wherein in the step A, the user terminal feeds back the correction value information in response to an instruction from the base station in the step B.

In the step A, the user terminal may increase resolution of the correction value information that is fed back, every time the correction value information is fed back.

The correction value information may include information indicating the resolution of the correction value information.

The communication control method may further comprises: a step C of accumulating, by the base station, the correction value information every time the correction value information is received in a case where the correction value information is fed back from the user terminal a plural number of times.

The communication control method may further comprises: a step D of determining, by the base station, a precoder matrix to be applied to transmission of a downlink signal, based on the precoder matrix information fed back from the user terminal, and accumulated correction value information obtained in the step C.

The communication control method may further comprises: a step E of resetting the accumulated correction value information obtained in the step C when there is a change in the precoder matrix information that is fed back.

The communication control method may further comprises: a step F of feeding back, by the user terminal, channel quality information to the base station, the channel quality information indicating a modulation scheme and coding rate preferably used in the downlink, wherein in the step F, the user terminal corrects the channel quality information that is fed back, when feeding back the correction value information.

The precoder matrix information may indicate a precoder matrix in which a null is directed toward the user terminal.

The precoder matrix information may indicate a precoder matrix in which a beam is directed toward the user terminal.

A user terminal of the present invention feeds back precoder matrix information to a base station that transmits a downlink signal through a plurality of antenna ports, the precoder matrix information being indicating a precoder matrix preferably used in a downlink, the downlink signal being precoded by using a precoder matrix. The user terminal comprises: a control unit that feeds back correction value information for correcting the precoder matrix information to the base station when the precoder matrix information is fed back or after the precoder matrix information is fed back.

A base station of the present invention transmits a downlink signal through a plurality of antenna ports, the downlink signal being precoded using a precoder matrix. The base station comprises: a first reception unit that receives precoder matrix information that is fed back from a user terminal; and a second reception unit that receives correction value information that is fed back from the user terminal, when the precoder matrix information is fed back or after the precoder matrix information is fed back, wherein the precoder matrix information indicates a precoder matrix preferably used in a downlink, and the correction value information includes information for correcting the precoder matrix information.

BRIEF DESCRIPTION OF THE DRAWINGS

FIG. 11 is a diagram illustrating an operation environment of the eNB and the UE according to the second embodiment (part 2).

FIG. 12 is a sequence diagram illustrating a detailed example of an operation sequence of the eNB and the UE according to the second embodiment.

DESCRIPTION OF THE EMBODIMENTS

Hereinafter, embodiments of the present invention will be described with reference to the accompanying drawings. Note that in the following drawing according to the embodiments, identical or similar symbols are assigned to identical or similar portions.

Overview of Embodiments

A communication control method according to an embodiment is applied to a mobile communication system including a base station that transmits a downlink signal through a plurality of antenna ports, and a user terminal that feeds back precoder matrix information to the base station, the downlink signal being precoded by using a precoder matrix, the precoder matrix information being indicating a precoder matrix preferably used in a downlink.

The communication control method according to the embodiment comprises: a step of feeding back, by the user terminal, correction value information for correcting the precoder matrix information to the base station when the precoder matrix information is fed back or after the precoder matrix information is fed back.

In this way, the base station is able to correct precoder matrix information (specifically, a precoder matrix indicated by the precoder matrix information), which is fed back, using correction value information that is fed back, thereby accurately directing a beam/a null toward the user terminal.

First Embodiment

Figure 1:
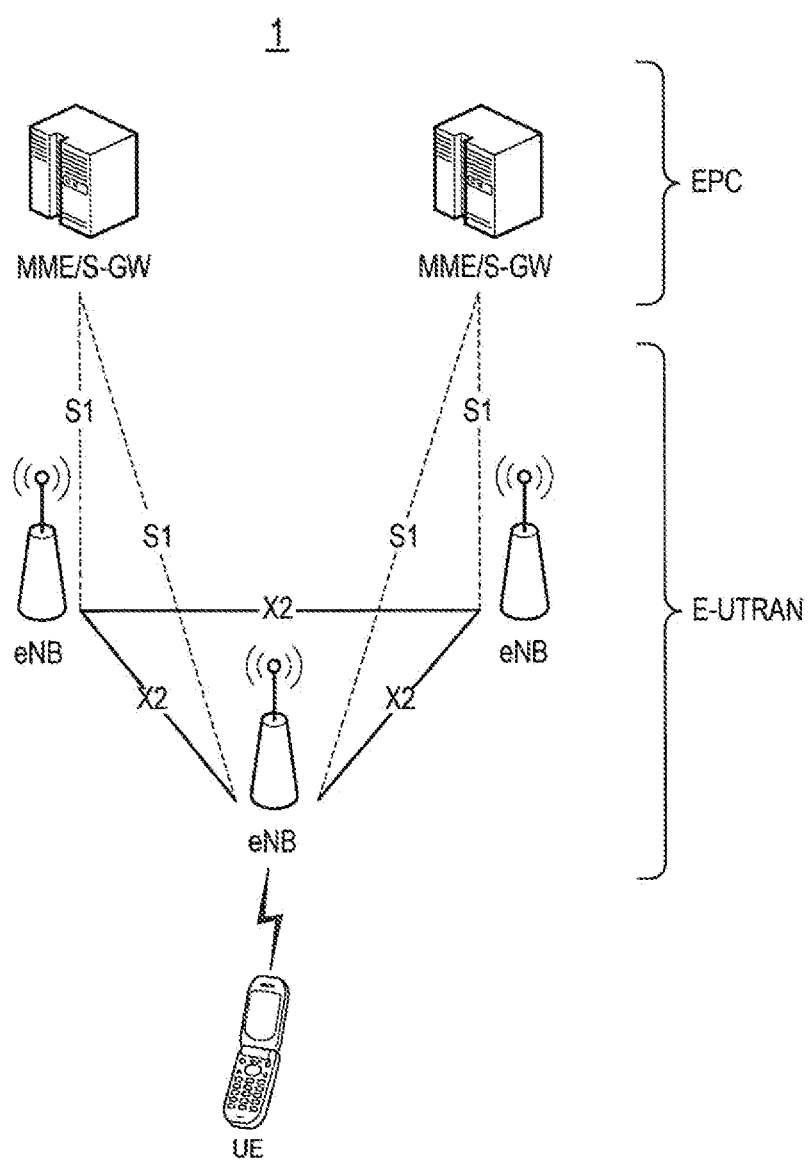
FIG. 1 is a configuration diagram of an LTE system according to a first embodiment and a second embodiment.

Hereinafter, a first embodiment will be described.
(Overview of LTE System)
First, the overview of an LTE system will be described.
FIG. 1 is a configuration diagram of the LTE system.

As illustrated in FIG. 1, an LTE system 1 includes UE (User Equipment), E-UTRAN (Evolved-UMTS Terrestrial Radio Access Network), and EPC (Evolved Packet Core).

The UE is a mobile radio communication device and corresponds to a user terminal. The UE is a mobile radio communication device, and performs radio communication with a cell (called a "serving cell"), which established a connection, in a connected state corresponding to a state during a connection.

The E-UTRAN includes a plurality of eNBs (evolved Node-B). The eNB is a stationary radio communication device that performs radio communication with the UE, and corresponds to a base station. Each eNB configures one cell or a plurality of cells. The eNB, for example, has a radio resource management (RRM) function, a routing function of user data, and a measurement control function for mobility control and scheduling.

The EPC includes MME (Mobility Management Entity) and S-GW (Serving-Gateway). The EPC corresponds to a core network. The MME is a network entity that performs various types of mobility control and the like for the UE, and corresponds to a control station. The S-GW is a network entity that performs transmission control of user data, and corresponds to a switching center.

The eNBs are connected to one another through an X2 interface. Furthermore, the eNBs are connected to the MME and the S-GW through S1 interfaces.

Figure 2:
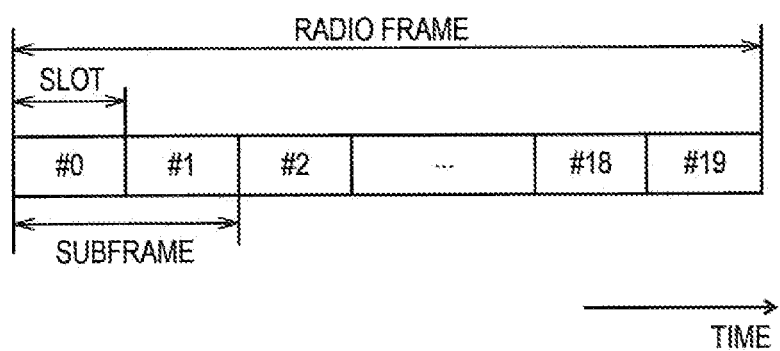
FIG. 2 is a configuration diagram of a radio frame used in the LTE system according to the first embodiment and the second embodiment.

FIG. 2 is a configuration diagram of a radio frame used in the LTE system 1. The LTE system 1 employs OFDMA (Orthogonal Frequency Division Multiplexing Access) in a downlink (DL) and SC-FDMA (Single Carrier Frequency Division Multiple Access) in an uplink (UL).

As illustrated in FIG. 2, the radio frame includes 10 subframes arranged in a time direction, wherein each subframe includes two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes 12 continuous subcarriers and configures one unit when a frequency and time resource is assigned to the UE. Each symbol is provided at ahead thereof with a guard interval called a cyclic prefix (CP).

In the downlink, an interval of several symbols at the head of each subframe is a control region mainly used as a physical downlink control channel (PDCCH). Furthermore, a remaining interval of each subframe is a data region mainly used as a physical downlink shared channel (PDSCH).

The PDCCH carries a control signal. The control signal, for example, includes uplink SI (Scheduling Information), downlink SI, and a TPC bit. The uplink SI indicates the assignment of an uplink frequency and time resource and the downlink SI indicates the assignment of a downlink frequency and time resource. The TPC bit is a signal for instructing increase or decrease in uplink transmission power.

The PDSCH carries a control signal and/or user data. For example, a downlink data region may be assigned only to the user data, or assigned such that the user data and the control signal are multiplexed.

Furthermore, acknowledgement (ACK)/nonacknowledgement (NACK) is carried through a physical HARQ indicator channel (PHICH). The ACK/NACK indicates whether decoding of a signal transmitted through an uplink physical channel (for example, PUSCH) is succeeded.

In the uplink (UL), both end portions in the frequency direction of each subframe are control regions mainly used as a physical uplink control channel (PUSCH). Furthermore, the center portion in the frequency direction of each subframe is a data region mainly used as a physical uplink shared channel (PUSCH).

The PUSCH carries a control signal. The control signal, for example, includes CQI (Channel Quality Indicator), PMI (Precoding Matrix Indicator), RI (Rank Indicator), SR (Scheduling Request), and ACK/NACK.

The CQI indicates a modulation scheme and coding rate (MCS) preferred to be used in the downlink, based on downlink channel quality. In the present embodiment, the CQI corresponds to channel quality information.

The PMI indicates a precoder matrix (PM) preferred to be used in the downlink. Specifically, the PMI indicates a precoder matrix in which a beam is directed toward UE serving as a transmission source of the PMI. In the present embodiment, the PMI corresponds to precoder matrix information.

The RI indicates the number of layers (the number of streams) preferred to be used in the downlink.

The SR is a signal for requesting the assignment of an uplink frequency and time resource (an uplink resource block).

The ACK/NACK indicates whether decoding of a signal transmitted through a downlink physical channel (for example, PDSCH) is succeeded.

The PUSCH is a physical channel for carrying a control signal and/or user data. For example, an uplink data region may be assigned only to the user data, or assigned such that the user data and the control signal are multiplexed.

(Configuration of eNB and UE)

Figure 3:
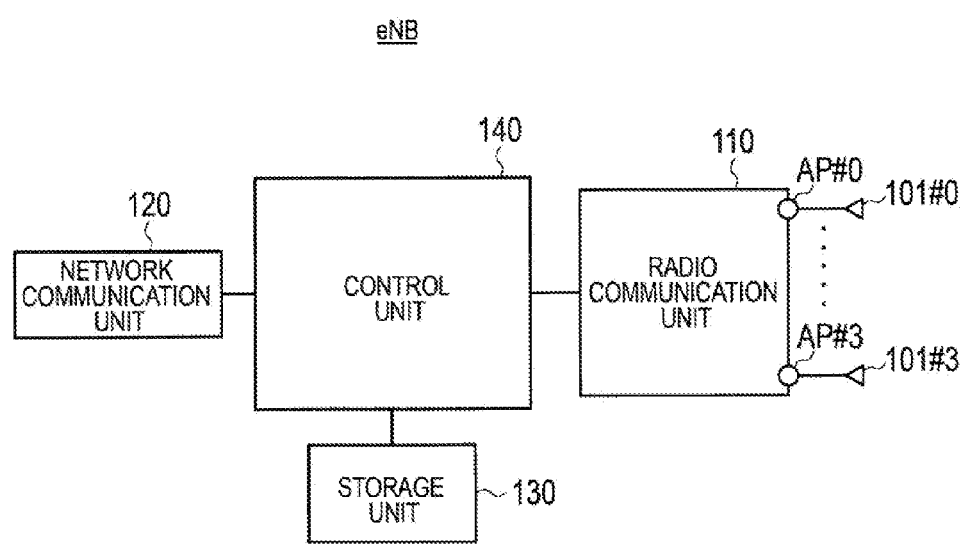
FIG. 3 is a block diagram of eNB according to the first embodiment and the second embodiment.

FIG. 3 is a block diagram of the eNB.

As illustrated in FIG. 3, the eNB includes a plurality of antenna elements 101#0 to 101#3, a radio communication unit 110, a network communication unit 120, a storage unit 130, and a control unit 140.

The antenna elements 101#0 to 101#3 are connected to antenna ports AP #0 to AP #3, respectively. In addition, in the present embodiment, the number of antenna ports AP is four. However, the number of antenna ports AP may be two or eight. Furthermore, one antenna element 101 is connected to one antenna port AP. However, two or more antenna elements 101 may be connected to one antenna port AP.

The radio communication unit 110 performs radio communication through a plurality of antenna ports AP (a plurality of antenna elements 101). At the time of transmission, the radio communication unit 110 performs signal processing for a baseband signal, performs up-converting, amplification and the like for the processed signal, and then transmits a radio signal. At the time of reception, the radio communication unit 110 performs amplification, down-converting and the like for a received signal, performs signal processing for a baseband signal, and then outputs the processed signal to the control unit 140.

The radio communication unit 110 transmits, to each antenna port AP, a cell-specific reference signal and/or a CSI reference signal (hereinafter, simply referred to as a "reference signal (RS)") that is used in measurement, demodulation and the like in the UE. Since the reference signals transmitted from the antenna ports AP are different from one another, the UE is able to perform measurement and the like for each antenna port AP.

The radio communication unit 110 transmits a downlink signal (a control signal and/or user data), which was precoded using a precoder matrix, through the plurality of antenna ports AP, thereby controlling a directional pattern, for example, forming a beam or a null.

The radio communication unit 110 may support closed-loop spatial multiplexing, in which a plurality of data streams (layers) are transmitted in a parallel manner through the same frequency and time resource (resource block), on the basis of PMI and RI fed back from the UE. The closed-loop spatial multiplexing is SU-MIMO for a single user (SU) and MU-MIMO for multiple users (MU).

Figure 4:
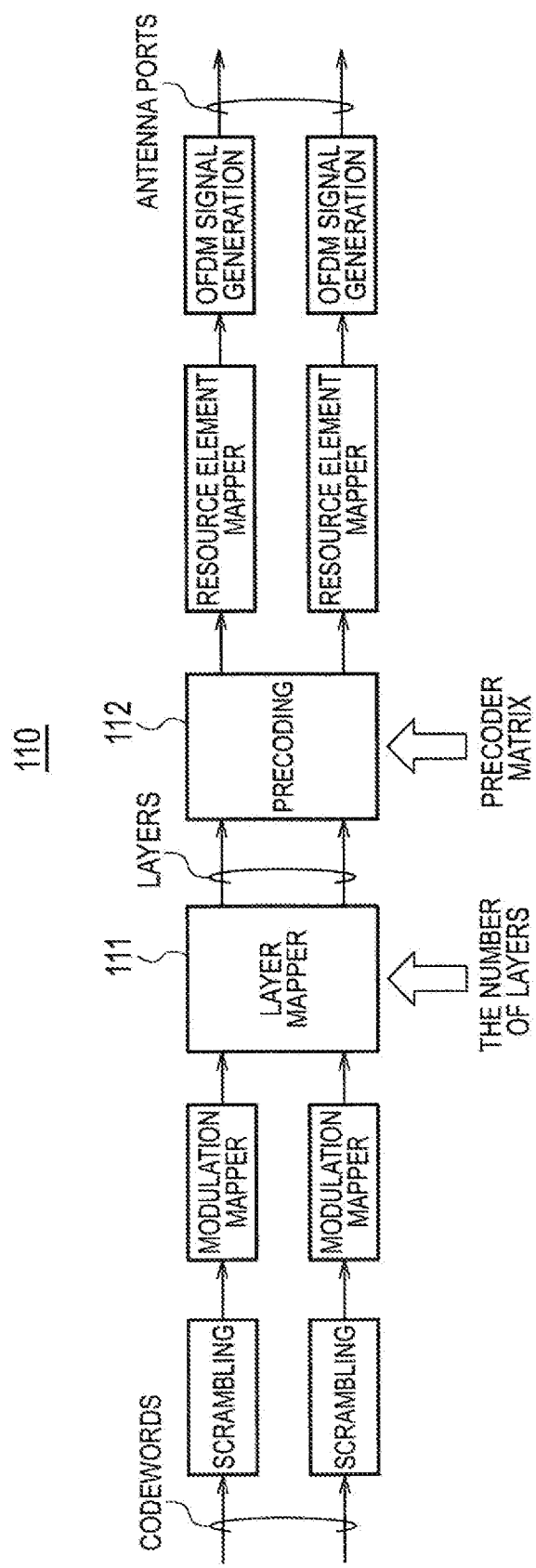
FIG. 4 is a block diagram of a radio communication unit for performing spatial multiplexing.

FIG. 4 is a block diagram of the radio communication unit 110 for performing spatial multiplexing. Details of each block are disclosed in 3GPP TS 36.211. However, an overview of each block will be described herein. As illustrated in FIG. 4, one or two codewords to be transmitted through a physical channel are scrambled, are modulated into a modulation symbol, and then are mapped to a plurality of layers by a layer map 111. The codeword is an error correction data unit. The number of layers is determined on the basis of RI fed back from the UE.

A precoder 112 precodes a modulation symbol of each layer using a precoder matrix of each layer. The precoder matrix is determined on the basis of PMI fed back from the UE. The precoded modulation symbol is mapped to a resource element, is converted into an OFDM signal of a temporal domain, and is output to each antenna port AP. In addition, the resource element is a resource unit including one subcarrier and one symbol.

Returning to FIG. 3, the network communication unit 120 communicates with the EPC using the S1 interface. Furthermore, the network communication unit 120 performs communication (inter-base station communication) with adjacent eNB using the X2 interface.

The storage unit 130 is configured using a memory and the like and stores various types of information used for control and the like by the control unit 140. The control unit 140 is configured using a processor and the like, and controls various functions of the eNB.

Figure 5:
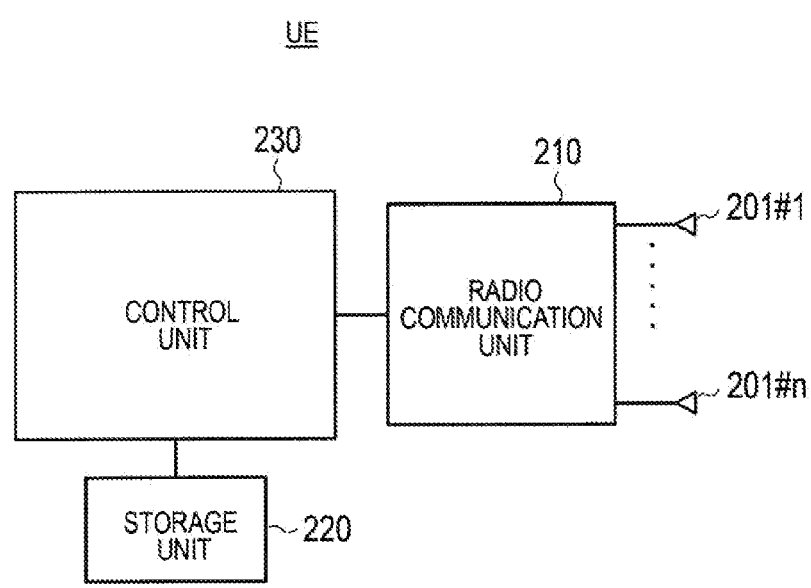
FIG. 5 is a block diagram of UE according to the first embodiment and the second embodiment.

FIG. 5 is a block diagram of the UE.

As illustrated in FIG. 5, the UE includes a plurality of antenna elements 201#1 to 201#n, a radio communication unit 210, a storage unit 220, and a control unit 230. The UE may include a user interface unit, a battery and the like.

For example, two or four antenna elements 201 are provided. The radio communication unit 210 performs radio communication through the plurality of antenna elements 201. At the time of transmission, the radio communication unit 210 performs signal processing for a baseband signal, performs up-converting, amplification and the like for the processed signal, and then transmits a radio signal. At the time of reception, the radio communication unit 210 performs amplification, down-converting and the like for a received signal, performs signal processing for a baseband signal, and then outputs the processed signal to the control unit 230.

When the closed-loop spatial multiplexing is performed, the radio communication unit 210 generates channel state information (CSI) on the basis of the reference signal received from the eNB, and feeds back the channel state information to the eNB. The channel state information includes CQI, PMI, and RI.

The radio communication unit 210 selects, according to a predetermined rule, an appropriate precoder matrix from candidates (code books) of precoder matrices determined in advance, and feeds back an index of the selected precoder matrix as PMI.

The radio communication unit 210 performs decoding (MIMO decoding) and the like for a downlink signal received from the eNB, on the basis of the reference signal received from the eNB or TPMI (Transmitted PMI) notified from the eNB. The TPMI is information indicating a precoder matrix used when the eNB transmits the downlink signal, and corresponds to transmission precoder matrix information.

The storage unit 220 is configured using a memory and the like and stores various types of information used for control and the like by the control unit 230. The control unit 230 is configured using a processor and the like, and controls various functions of the UE.

(Operation of eNB and UE)

In the present embodiment, the eNB and the UE support CB (Coordinated Beamforming)-CoMP (Coordinated Multi-Point).

In the CoMP, an antenna group in the same place is positioned as one "point" and a plurality of points communicate with the UE in cooperation with one another. A point group performing cooperative communication with the UE is called a CoMP cooperation set.

The CB-CoMP indicates a scheme in which only one point holds data for the downlink, and a plurality of points perform beamforming in cooperation with one another. In the present embodiment, the CoMP cooperation set includes a plurality of eNBs.

Figure 6:
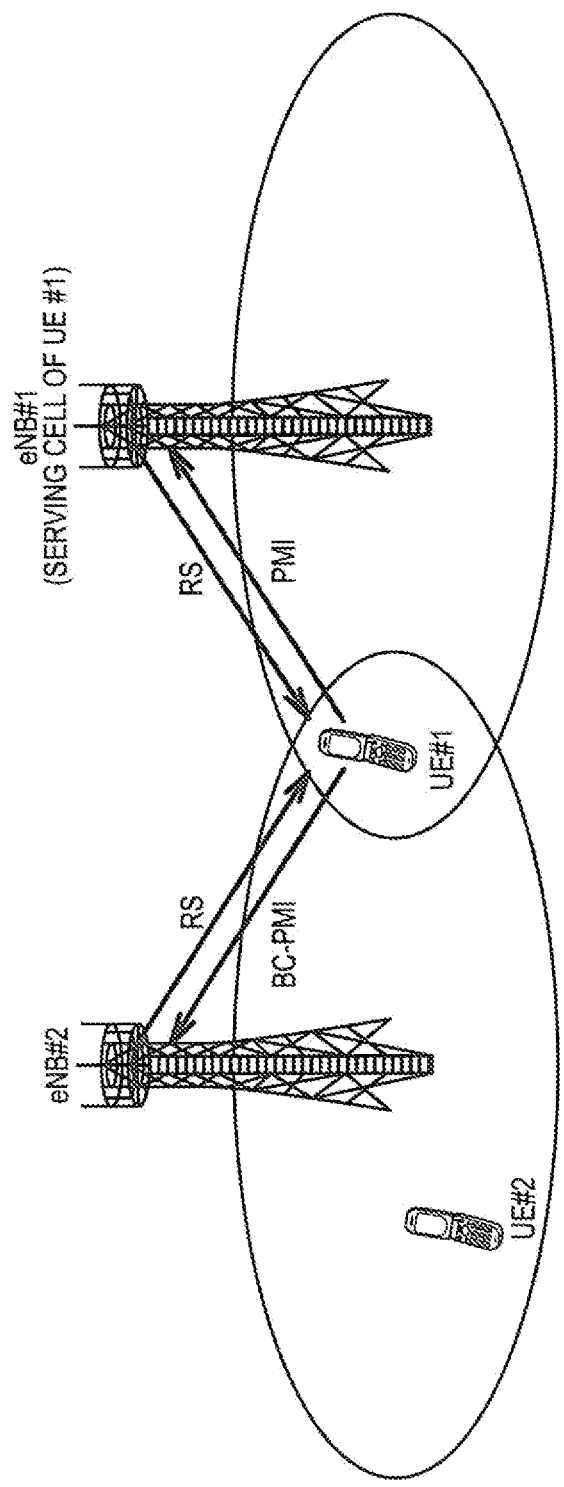
FIG. 6 is a diagram illustrating an operation environment of the eNB and the UE according to the first embodiment (part 1).
Figure 7:
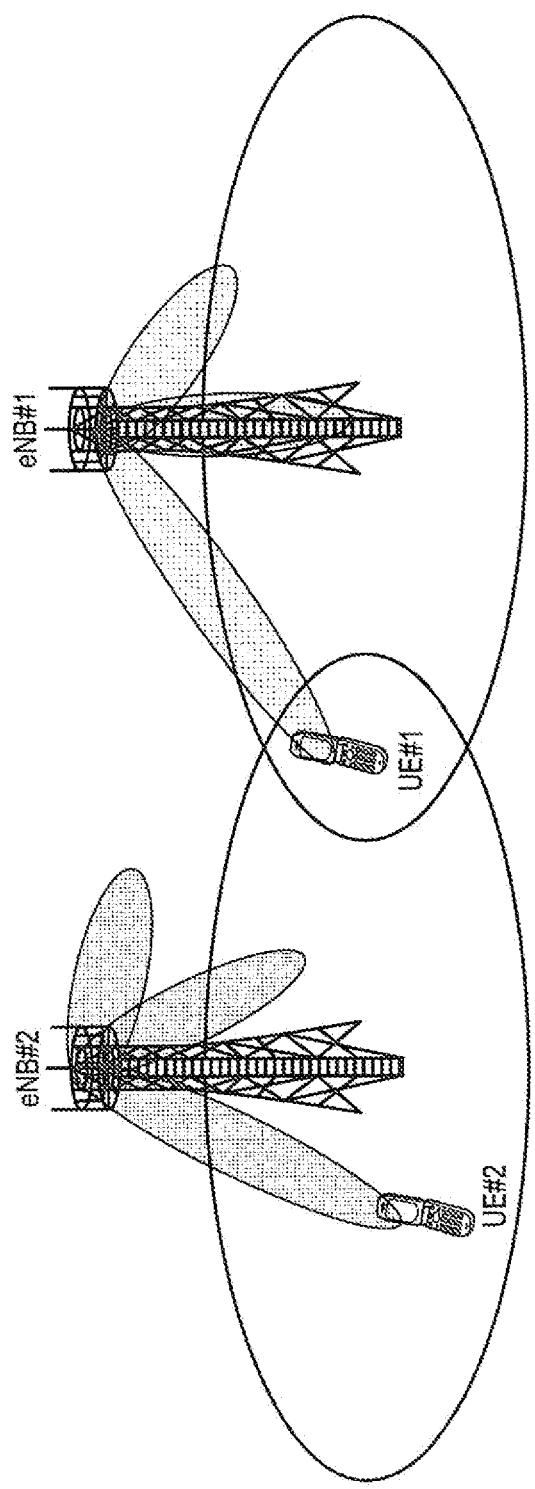
FIG. 7 is a diagram illustrating an operation environment of the eNB and the UE according to the first embodiment (part 2).

FIG. 6 and FIG. 7 are diagrams illustrating operation environments of the eNB and the UE according to the present embodiment.

As illustrated in FIG. 6 and FIG. 7, a UE #1 performs communication by employing an eNB #1 as a serving cell, and a UE #2 performs communication by employing an eNB #2 as a serving cell. The eNB #1 and the eNB #2 perform the CB-CoMP with the UE #1. Specifically, the eNB #1 directs a beam toward the UE #1 subordinate to the eNB #1. The eNB #2 directs a null toward the UE #1 subordinate to the eNB #1 while directing a beam toward the UE #2 subordinate to the eNB #2.

As illustrated in FIG. 6, the UE #1 feeds back, to the eNB #1, PMI indicating a precoder matrix, in which a beam is directed toward the UE #1, on the basis of a reference signal received from the eNB #1.

Furthermore, the UE #1 feeds back, to the eNB #2, Best Companion PMI (hereinafter, referred to as "BC-PMI") indicating a precoder matrix, in which a null is directed toward the UE #1, on the basis of a reference signal received from the eNB #2.

The BC-PMI may be directly fed back from the UE #1 to the eNB #2. Alternatively, the BC-PMI may be indirectly fed back from the UE #1 to the eNB #2 via the eNB #1.

The UE #2 may feedback, to the eNB #2, PMI indicating aprecoder matrix, in which a beam is directed toward the UE #2, on the basis of the reference signal received from the eNB #2.

As illustrated in FIG. 7, the eNB #1 performs precoding using the precoder matrix indicated by the PMI fed back from the UE #1, thereby transmitting a downlink signal to the UE #1 in a directional pattern in which a beam is directed toward the UE #1.

The eNB #2 performs precoding using the precoder matrix indicated by the BC-PMI fed back from the UE #1, thereby transmitting a downlink signal to the UE #2 in a directional pattern in which a null is directed toward the UE #1.

However, since the precoding for directing a null requires very high accuracy but all possible values (indices) of the BC-PMI are limited, the eNB #2 is not able to use a precoder matrix capable of achieving such high accuracy. As a consequence, it is difficult to reliably perform the CB-COMP.

In this regard, in the present embodiment, it is possible to reliably perform the CB-COMP as follows.

Firstly, the UE #1 selects an optimal precoder matrix from candidates (code books) of a precoder matrix determined in advance such that a null is directed toward the UE #1, and acquires BC-PMI indicating the selected precoder matrix. In the present embodiment, the BC-PMI corresponds to precoder matrix information.

At this time, in order to increase the accuracy by which a null is directed toward the UE #1, the UE #1 calculates a correction value for finely adjusting the precoder matrix indicated by the BC-PMI, and acquires PAI (Precoding Adjustment Indicator) indicating the calculated correction value. In the present embodiment, the PAI corresponds to correction value information. When the correction value (an immediate value) calculated by the UE #1 is fed back, since overhead is increased, the PAI is used as an index of the correction value calculated by the UE #1 in the present embodiment.

Then, the UE #1 feeds back the acquired BC-PMI and PAI to the eNB #2. The BC-PMI and the PAI may be directly fed back from the UE #1 to the eNB #2. Alternatively, the BC-PMI and the PAI may be indirectly fed back from the UE #1 to the eNB #2 via the eNB #1. Furthermore, the PAI may be simultaneously fed back as additional information of the BC-PMI, or the PAI may be fed back after the BC-PMI is fed back.

In addition, when no CB-COMP is performed, the PAI may not be fed back. For example, when the CB-COMP is performed, the eNB #2 (or the eNB #1) may instruct the UE #1 to feed back the PAI.

Secondly, the eNB #2 reflects (multiplies) a correction value, which is indicated by the PAI notified from the UE #1, in (by) a precoder matrix indicated by the BC-PMI fed back from the UE #1, thereby correcting the precoder matrix. Then, the eNB #2 applies the corrected precoder matrix to transmission to the UE #2.

In the present embodiment, the UE #1 increases resolution of the correction value indicated by the PAI at every feedback of the PAI. For example, the UE #1 increases the resolution of the correction value indicated by the PAI as with $\pm\pi/4$ in the first time and $\pm\pi/8$ in the second time. However, after predetermined resolution is reached, the UE #1 may stop increasing the resolution, that is, may limit the resolution. Furthermore, the PAI may include information on the resolution of the correction value indicated by the PAI. For example, in the case where a field for storing the information on the resolution is provided in the PAI, the resolution may be defined as $\pm\pi/4$ if the field has a value of "0" and defined as $\pm\pi/8$ if the field has a value of "1".

When the PAI is fed back from the UE #1 a plural number of times, the eNB #2 accumulates a correction value indicated by the PAI to acquire an accumulated correction value (hereinafter, referred to as an "accumulated PAI correction value") every time the PAI is received. Then, the eNB #2 determines a precoder matrix, which is applied to transmission of a downlink signal to the UE #2, in response to the fed-back BC-PMI and the accumulated PAI correction value. Specifically, the eNB #2 reflects the accumulated PAI correction value in the precoder matrix indicated by the fed-back BC-PMI, thereby correcting the precoder matrix.

When there is a change in the BC-PMI that is fed back, the eNB #2 resets the accumulated PAI. In other words, the eNB #2 continues to accumulate the PAI until there is a change in (a value of) the BC-PMI that is fed back.

In this way, the eNB #2 transmits a downlink signal using the precoder matrix after the accumulated correction, thereby appropriately performing null steering in the CB-CoMPO.

Figure 8:
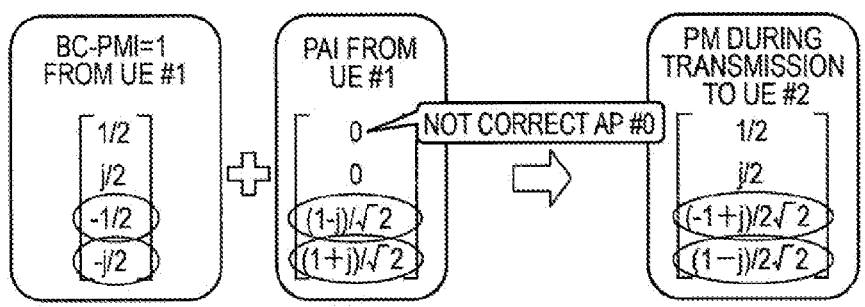
FIG. 8 is a diagram for explaining a detailed example of operations of the eNB and the UE according to the first embodiment.

FIG. 8 is a diagram for explaining a detailed example of operations of the UE #1 and the eNB #2 according to the present embodiment.

As illustrated in FIG. 8, the UE #1 feeds back BC-PMI "1" to the eNB #2. Furthermore, in a precoder matrix indicated by the BC-PMI "1", a weight corresponding to the antenna port AP #0 of the eNB #2 is "1/2", a weight corresponding to the antenna port AP #1 is "j/2", a weight corresponding to the antenna port AP #2 is "−1/2", and a weight corresponding to the antenna port AP #3 is "−j/2".

When feeding back the BC-PMI to the eNB #2, the UE #1 feeds back PAI for correcting (finely adjusting) the BC-PMI to the eNB #2. In the example of FIG. 8, in relation to a correction value indicated by the PAI, a correction value corresponding to the antenna port AP #0 of the eNB #2 is "0", a correction value corresponding to the antenna port AP #1 is "0", a weight corresponding to the antenna port AP #2 is "$(1-j)/\sqrt{2}$", and a weight corresponding to the antenna port AP #3 is "$(1+j)/\sqrt{2}$".

In addition, in the precoder matrix, since the weight corresponding to the antenna port AP #0 has been fixedly set, the weight corresponding to the antenna port AP #0 is not corrected.

The eNB #2 corrects the precoder matrix indicated by the BC-PMI fed back from the UE #1 using the correction value indicated by the PAI fed back from the UE #1. In the example of FIG. 8, the weight corresponding to the antenna port AP #2 is corrected from "−1/2" to "$(-1+j)/2\sqrt{2}$" and the weight corresponding to the antenna port AP #3 is corrected from "−j/2" to "$(1-j)/2\sqrt{2}$". Next, the eNB #2 determines to apply the corrected precoder matrix (PM) to transmission of a downlink signal to the UE #2. Then, the eNB #2 transmits a downlink signal to the UE #2 using the determined precoder matrix.

Figure 9:
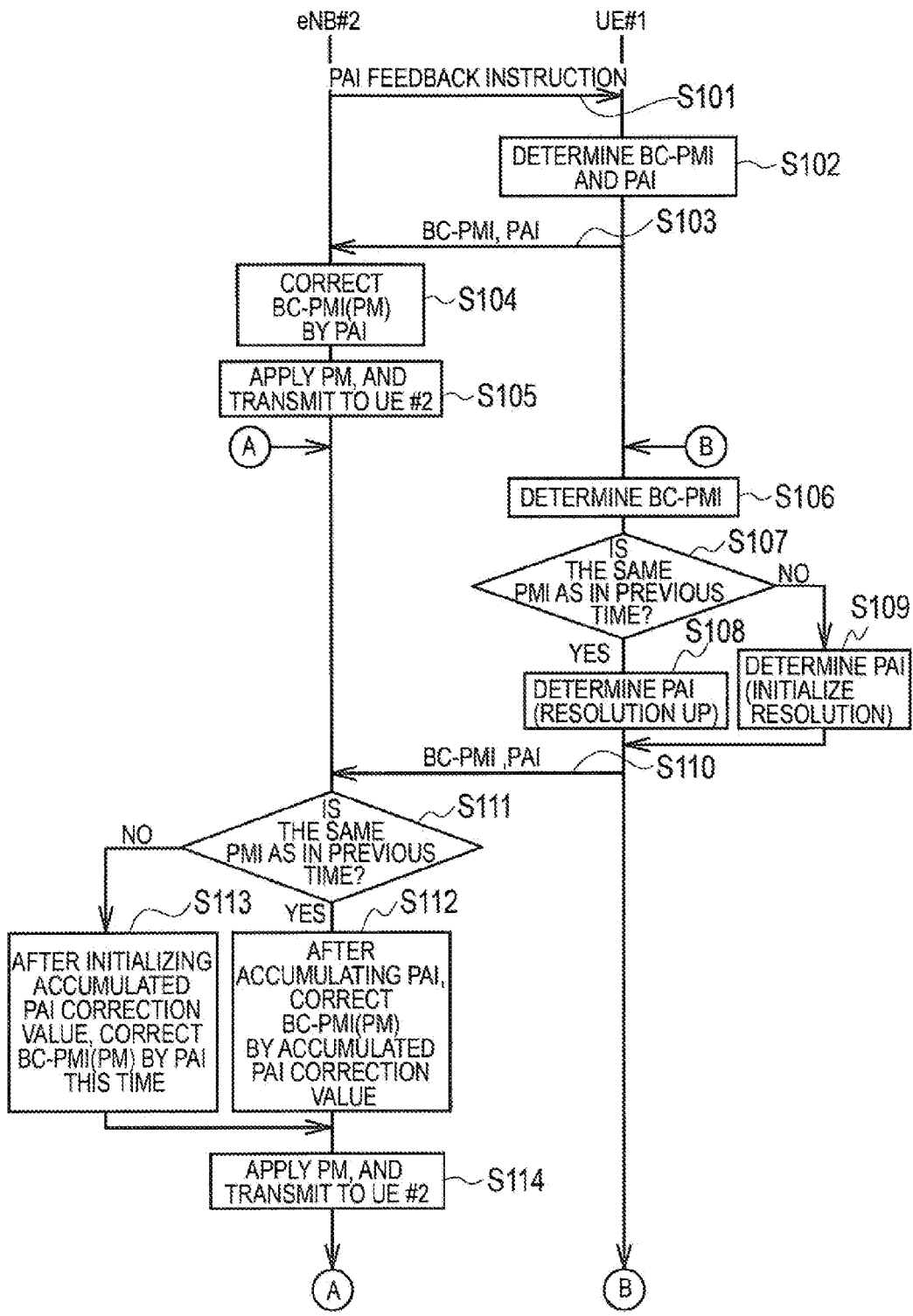
FIG. 9 is a sequence diagram illustrating a detailed example of an operation sequence of the eNB and the UE according to the first embodiment.

FIG. 9 is a sequence diagram illustrating a detailed example of an operation sequence of the UE #1 and the eNB #2 according to the present embodiment.

As illustrated in FIG. 9, in step S101, the eNB #2 (or the eNB #1) instructs the UE #1 to start to feed back PAI in response to the start of CB-COMP.

In step S102, the UE #1 determines BC-PMI and PAI to be fed back to the eNB #2.

In step S103, the UE #1 feeds back the determined BC-PMI and PAI to the eNB #2.

In step S104, the eNB #2 determines a precoder matrix, which is applied to transmission of a downlink signal to the UE #2, in response to the BC-PMI and the PAI from the UE #1.

In step S105, the eNB #2 transmits a downlink signal to the UE #2 using the determined precoder matrix.

In step S106, the UE #1 determines BC-PMI to be fed back to the eNB #2.

In step S107, the UE #1 confirms whether BC-PMI, which is fed back this time, is equal to BC-PMI that was fed back previous time.

When the BC-PMI, which is fed back this time, is equal to the BC-PMI that was fed back previous time (step S107; YES), the UE #1 determines PAI of this time such that resolution of a correction value is improved than before, in step S108.

On the other hand, when the BC-PMI, which is fed back this time, is different from the BC-PMI that was fed back previous time (step S107; NO), the UE #1 determines the PAI of this time such that the correction value has a default resolution in step S109.

In step S110, the UE #1 feeds back the determined BC-PMI and PAI to the eNB #2.

In step S111, the eNB #2 confirms whether the BC-PMI fed back this time is equal to the BC-PMI fed back previous time.

When the BC-PMI fed back this time is equal to the BC-PMI fed back previous time (step S111; YES), the eNB #2 accumulates a correction value indicated by the PAI fed back this time to a correction value indicated by the PAI fed back previous time, in step S112. Then, the eNB #2 corrects a precoder matrix indicated by the BC-PMI using an accumulated PAI correction value.

On the other hand, when the BC-PMI fed back this time is different from the BC-PMI fed back previous time (step S111; NO), the eNB #2 initializes (resets) the accumulated PAI correction value in step S113. Then, the eNB #2 corrects a precoder matrix indicated by the BC-PMI using the correction value indicated by the PAI fed back this time.

In step S114, the eNB #2 transmits a downlink signal to the UE #2 using the corrected precoder matrix. Then, the procedure returns to the step S106.

Conclusion

As described above, the LTE system 1 includes the eNB #2 configured to transmit a downlink signal precoded by using a precoder matrix through the plurality of antenna ports AP, and the UE #1 configured to feed back, to the eNB #2, BC-PMI (precoder matrix information) indicating a precoder matrix preferably used in the downlink. When feeding back the BC-PMI or after feeding back the BC-PMI, the UE #1 feeds back PAI (correction value information) for correcting the BC-PMI to the eNB #2.

In this way, the eNB #2 is able to correct BC-PMI (specifically, a precoder matrix indicated by the BC-PMI), which is fed back, using the PAI that is fed back, thereby accurately directing a null toward the UE #1.

In the present embodiment, when the CB-COMP is performed, the eNB #2 (or the eNB #1) instructs the UE #1 to notify the PAI. The UE #1 feeds back the PAI in response to an instruction from the eNB #2 (or the eNB #1).

In this way, since the PAI is fed back in the case where the PAI is necessary, but the PAI is not fed back in the case where the PAI is not necessary, it is possible to suppress an increase in overhead.

In the present embodiment, at every feedback of the PAI, the UE #1 increases resolution of the PAI that is fed back. The PAI may include information indicating the resolution of the PAI. When the PAI is fed back from the UE #1 a plural number of times, the eNB #2 accumulates the PAI every time the PAI is received. The eNB #2 determines a precoder matrix, which is applied to transmission of a downlink signal to the UE #2, in response to the BC-PMI fed back from the UE #1 and the accumulated PAI. When there is a change in the BC-PMI that is fed back, the eNB #2 resets the accumulated PAI.

In this way, the accuracy by which a null is directed toward the UE #1 is sequentially improved until the BC-PMI is changed, so that it is possible to reliably perform the CB-CoMPO.

Second Embodiment

Hereinafter, a second embodiment will be described. The present embodiment is an embodiment in which the present invention is applied to MU-MIMO.

In the present embodiment, differences from the first embodiment will be mainly described, and a description identical to that of the first embodiment will be appropriately omitted.

(Operation of eNB and UE)

Figure 10:
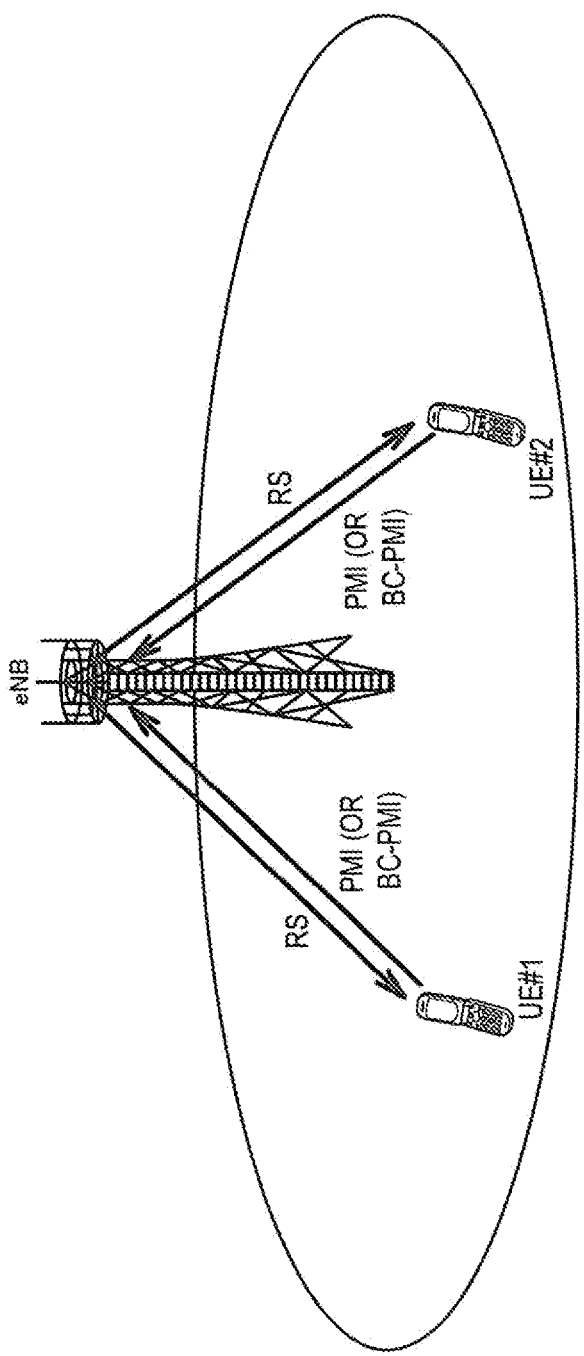
FIG. 10 is a diagram illustrating an operation environment of the eNB and the UE according to the second embodiment (part 1).

FIG. 10 and FIG. 11 are diagrams illustrating operation environments of the eNB and the UE according to the present embodiment.

As illustrated in FIG. 10 and FIG. 11, the eNB performs the closed-loop spatial communication with two UEs (UE #1 and UE #2). That is, the eNB assigns the same frequency and time resource (resource block) to the UE #1 and UE #2 and performs the MU-MIMO.

As illustrated in FIG. 10, the UE #1 feeds back PMI to the eNB on the basis of a reference signal received from the eNB, wherein the PMI indicates a precoder matrix in which a beam is directed toward the UE #1. The UE #2 feeds back PMI to the eNB on the basis of the reference signal received from the eNB, wherein the PMI indicates a precoder matrix in which a beam is directed toward the UE #2. In addition, in the present embodiment, a description will be provided for a case where the PMI is fed back in the MU-MIMO. However, instead of the PMI or in addition to the PMI, BC-PMI may be fed back.

As illustrated in FIG. 11, the eNB performs precoding using a precoder matrix indicated by the PMI fed back from the UE #1, thereby transmitting a downlink signal to the UE #1 in a directional pattern in which a beam is directed toward the UE #1. Furthermore, the eNB performs precoding using a precoder matrix indicated by the PMI fed back from the UE #2, thereby transmitting a downlink signal to the UE #2 in a directional pattern in which a beam is directed toward the UE #2.

In the MU-MIMO, when UEs to be multiplexed with each other are adjacent to each other, it is preferable to improve the accuracy by which a beam is directed toward each UE. In this regard, in the present embodiment, excellent beamforming is performed in the MU-MIMO as follows.

Firstly, each UE selects an optimal precoder matrix from candidates (code books) of a precoder matrix determined in advance such that a beam is directed toward each UE, and acquires PMI indicating the selected precoder matrix. In the present embodiment, the PMI corresponds to precoder matrix information.

At this time, in order to increase the accuracy by which a beam is directed toward the each UE, each UE calculates a correction value for finely adjusting the precoder matrix indicated by the PMI, and acquires PAI indicating the calculated correction value. When the calculated correction value (an immediate value) is fed back, overhead is increased, the PAI is used as an index of the calculated correction value in the present embodiment.

Then, each UE feeds back the acquired PMI and PAI to the eNB. The PAI may be simultaneously fed back as additional information of the PMI, or the PAI may be fed back after the PMI is fed back.

In addition, when no MU-MIMO is performed, the PAI may not be fed back. For example, when the MU-MIMO is performed, the eNB may instruct each UE to feed back the PAI.

Secondly, the eNB reflects (multiplies) a correction value, which is indicated by the PAI, in (by) a precoder matrix indicated by the PMI fed back from each UE, thereby correcting the precoder matrix. Then, the eNB applies the corrected precoder matrix to transmission.

In the present embodiment, each UE increases resolution of the correction value indicated by the PAI at every feedback of the PAI. For example, the UE #1 increases the resolution of the correction value indicated by the PAI as with $\pm\pi/4$ in the first time and $\pm\pi/8$ in the second time. However, after predetermined resolution is reached, the UE #1 may stop increasing the resolution, that is, may limit the resolution. Furthermore, the PAI may include information on the resolution of the correction value indicated by the PAI. For example, in the case where a field for storing the information on the resolution is provided in the PAI, the resolution may be defined as $\pm\pi/4$ if the field has a value of "0" and defined as $\pm\pi/8$ if the field has a value of "1".

When the PAI is fed back from each UE a plural number of times, the eNB accumulates, for each UE, a correction value indicated by the PAI to acquire an accumulated correction value (hereinafter, referred to as an "accumulated PAI correction value") every time the PAI is received. Then, the eNB determines a precoder matrix, which is applied to transmission of a downlink signal, in response to the fed-back PMI and the accumulated PAI correction value. Specifically, the eNB reflects the accumulated PAI correction value in the precoder matrix indicated by the fed-back PMI, thereby correcting the precoder matrix.

When there is a change in the PMI that is fed back, the eNB resets the accumulated PAI. In other words, the eNB continues to accumulate the PAI until there is a change in (a value of) the PMI that is fed back.

In this way, the eNB transmits a downlink signal using the precoder matrix after the accumulated correction, thereby appropriately performing beamforming in the MU-MIMO.

However, in the case of using the precoder matrix after the accumulated correction, since it is considered that channel quality is improved than the original quality, it is preferable to apply a modulation scheme and coding rate (MCS) with a high data rate as compared with MCS to be originally applied, in consideration of the degree of the improvement. Thus, in the present embodiment, when notifying the eNB of the PAI, each UE corrects CQI to be fed back to the eNB, in expectation of quality improvement due to the correction using the PAI.

Furthermore, in the case of a transmission mode using a cell-specific reference signal in data decoding, the eNB should notify the UE of PMI, which corresponds to a precoder matrix used by the eNB in transmission, as TPMI. This is because since no precoding is performed for CRS, the UE is not able to designate a state (a precoder matrix) of precoding on the basis of the CRS, and to decode precoded data.

Consequently, when the precoder matrix indicated by the PMI was corrected, if PMI corresponding to the corrected precoder matrix has not been defined for TPMI notified to the UE, the eNB selects PMI corresponding to a precoder matrix before the change as TPMI, and if the PMI corresponding to the corrected precoder matrix has been defined, the eNB selects the PMI as TPMI.

On the other hand, in the case of a transmission mode using DMRS (DeModulation Reference Signal/UE specific Reference Signal) in data decoding, the eNB needs not to notify the TPMI. This is because since precoding is performed for the DMRS similarly to data, the UE is able to decode data without considering an actually used precoder matrix.

FIG. 12 is a sequence diagram illustrating a detailed example of an operation sequence of the UE #1 and the eNB according to the present embodiment.

As illustrated in FIG. 12, in step S201, the eNB instructs the UE #1 to start to feed back PAI in response to the start of MU-MIMO.

In step S202, the UE #1 determines PMI to be fed back to the eNB.

In step S203, the UE #1 determines PAI and CQI to be fed back to the eNB. Furthermore, the UE #1 determines CQI, which is expected to be improved, by the PAI, from the original CQI (that is, CQI corresponding to the determined PMI), as CQI to be fed back.

In step S204, the UE #1 feeds back the determined PMI, PAI, and CQI to the eNB.

In step S205, the eNB determines a corrected precoder matrix, which is applied to transmission of a downlink signal to the UE #1, in response to the PMI and the PAI fed back from the UE #1.

In step S206, the eNB transmits a downlink signal to the UE #1 using the corrected precoder matrix and MCS indicated by the CQI fed back from the UE #1.

In step S207, the UE #1 determines PMI to be fed back to the eNB.

In step S208, the UE #1 confirms whether PMI, which is fed back this time, is equal to PMI that was fed back previous time.

When the PMI, which is fed back this time, is equal to the PMI that was fed back previous time (step S208; YES), the UE #1 determines PAI of this time such that resolution of a correction value is improved than before, in step S209. In this case, in consideration of the accumulated correction by the PAI, the UE #1 determines CQI, which is expected to be improved by the accumulated correction, as CQI to be fed back.

On the other hand, when the PMI, which is fed back this time, is different from the PMI that was fed back previous time (step S208; NO), the UE #1 determines the PAI of this time such that the correction value has a default resolution in step S210. In this case, the UE #1 determines CQI, which is expected to be improved, by the PAI, from the original CQI (that is, CQI corresponding to the determined PMI), as CQI to be fed back.

In step S211, the UE #1 feeds back the determined PMI, PAI, and CQI to the eNB.

In step S212, the eNB confirms whether the PMI fed back this time is equal to the PMI fed back previous time.

When the PMI fed back this time is equal to the PMI fed back previous time (step S212; YES), the eNB accumulates a correction value indicated by the PAI fed back this time to a correction value indicated by the PAI fed back previous time, in step S213. Then, the eNB corrects a precoder matrix indicated by the PMI using an accumulated correction value.

On the other hand, when the PMI fed back this time is different from the PMI fed back previous time (step S212; NO), the eNB initializes (resets) the accumulated PAI correction value in step S214. Then, the eNB corrects a precoder matrix indicated by the PMI using the correction value indicated by the PAI fed back this time.

In step S215, the eNB transmits a downlink signal to the UE #1 using the corrected precoder matrix and the MCS indicated by the CQI fed back from the UE #1.

Conclusion

As described above, in the present embodiment, when feeding back the PMI or after feeding back the PMI, the UE #1 feeds back PAI (correction value information) for correcting the PMI to the eNB.

In this way, the eNB is able to correct PMI (specifically, a precoder matrix indicated by the PMI), which is fed back, using the PAI that is fed back, thereby accurately directing a beam toward the UE #1.

In the present embodiment, when the MU-MIMO is performed, the eNB instructs the UE #1 to notify the PAI. The UE #1 feeds back the PAI in response to an instruction from the eNB.

In this way, since the PAI is fed back in the case where the PAI is necessary, but the PAI is not fed back in the case where the PAI is not necessary, it is possible to suppress an increase in overhead.

In the present embodiment, at every feedback of the PAI, the UE #1 increases resolution of the PAI that is fed back. The PAI may include information indicating the resolution of the PAI. When the PAI is fed back from the UE #1 a plural number of times, the eNB accumulates the PAI every time the PAI is received. The eNB determines a precoder matrix, which is applied to transmission of a downlink signal to the UE #1, in response to the PMI fed back from the UE #1 and the accumulated PAI. When there is a change in the PMI that is fed back, the eNB resets the accumulated PAI.

In this way, the accuracy by which a beam is directed toward the UE #1 is sequentially improved until the PMI is changed, so that it is possible to reliably perform the MU-MIMO.

Other Embodiments

Thus, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

For example, the aforementioned first embodiment to fourth embodiment can be performed separately and independently, and can be performed through a combination thereof. For example, the present invention can be applied to an operation environment in which both MU-MIMO and CB-COMP are used.

This application claims the benefit of priority from U.S. Provisional Application No. 61/604,685 (filed on Feb. 29, 2012), the entire contents of which are incorporated herein by reference.

INDUSTRIAL APPLICABILITY

As described, the present invention is useful in mobile communication fields.

The invention claimed is:

1. A communication control method, which is applied to a mobile communication system including a base station that transmits a downlink signal through a plurality of antenna ports, and a user terminal that feeds back precoder matrix information to the base station, the downlink signal being precoded by using a precoder matrix, the precoder matrix information indicating to the base station a precoder matrix preferably used in the downlink signal, the communication control method comprising:

feeding back, by the user terminal, correction value information for correcting the precoder matrix information to the base station when the precoder matrix information is fed back or after the precoder matrix information is fed back, wherein the precoder matrix information indicates the precoder matrix in which a null is directed toward the user terminal, the correction value information is for correcting the precoder matrix information to increase an accuracy by which the null is directed toward the user terminal, and the correction value information is information based on the plurality of antenna ports, reception quality in the downlink, and the precoder matrix.

2. The communication control method according to claim 1, further comprising:

instructing, by the base station, the user terminal to notify the correction value information, wherein the user terminal feeds back the correction value information in response to an instruction from the base station.

3. The communication control method according to claim 1, wherein, the user terminal increases resolution of the correction value information that is fed back, every time the correction value information is fed back.

4. The communication control method according to claim 1, wherein the correction value information includes information indicating the resolution of the correction value information.

5. The communication control method according to claim 1, further comprising: accumulating, by the base station, the correction value information every time the correction value information is received in a case where the correction value information is fed back from the user terminal a plural number of times.

6. The communication control method according to claim 5, further comprising: determining, by the base station, a precoder matrix to be applied to transmission of a downlink signal, based on the precoder matrix information fed back from the user terminal, and accumulated correction value information.

7. The communication control method according to claim 5, further comprising: resetting the accumulated correction value information when there is a change in the precoder matrix information that is fed back.

8. The communication control method according to claim 1, further comprising:

feeding back, by the user terminal, channel quality information to the base station, the channel quality information indicating a modulation scheme and coding rate preferably used in the downlink, wherein the user terminal corrects the channel quality information that is fed back, when feeding back the correction value information.

9. A user terminal, which feeds back precoder matrix information to a base station that transmits a downlink signal through a plurality of antenna ports, the precoder matrix information indicating to the base station a precoder matrix preferably used in the downlink signal, the downlink signal being precoded by using the precoder matrix, comprising:

a controller configured to feed back correction value information for correcting the precoder matrix information to the base station when the precoder matrix information is fed back or after the precoder matrix information is fed back, wherein the precoder matrix information indicates the precoder matrix in which a null is directed toward the user terminal, the correction value information is for correcting the precoder matrix information to increase an accuracy by which the null is directed toward the user terminal, and the correction value information is information based on the plurality of antenna ports, reception quality in the downlink, and the precoder matrix.

10. A base station, which transmits a downlink signal through a plurality of antenna ports, the downlink signal being precoded using a precoder matrix, comprising:

a first receiver configured to receive precoder matrix information that is fed back from a user terminal; and a second receiver configured to receive correction value information that is fed back from the user terminal, when the precoder matrix information is fed back or after the precoder matrix information is fed back, wherein the precoder matrix information indicates to the base station the precoder matrix in which a null is directed toward the user terminal, the correction value information is for correcting the precoder matrix information to increase an accuracy by which the null is directed toward the user terminal, and the correction value information is information based on the plurality of antenna ports, reception quality in the downlink, and the precoder matrix.

* * * * *